United States Patent

[11] 3,547,425

[72] Inventor Howard W. Wachenheim
Smyrna, Ga.
[21] Appl. No. 764,834
[22] Filed Oct. 3, 1968
[45] Patented Dec. 15, 1970
[73] Assignee Engineering & Design Services Inc.
Marietta, Ga.
a corporation of Georgia

[54] LANDING GEAR ASSEMBLY
14 Claims, 4 Drawing Figs.
[52] U.S. Cl. .................................................... 267/64
[51] Int. Cl. ..................................................... B60g 11/26
[50] Field of Search ........................................ 267/64(A),
65(A)

[56] References Cited
UNITED STATES PATENTS
2,985,443 5/1961 Smith .......................... 267/64(A)
3,204,945 9/1965 Taylor ......................... 267/64(A)

Primary Examiner—James B. Marbert
Attorney—Cushman, Darby & Cushman

ABSTRACT: An aircraft landing gear constructed using a compressible fluid device as an enclosed, protected, easily replacable cartridge. This landing gear includes an outer cylindrical member closed at the top and an inner cylindrical assembly in sliding relationship therewith, a liquid spring inside of both with a first end of the spring in contact with the closed end of th outer cylinder and with a second end in pressure contact with the inner assembly. The inner cylindrical assembly has a small lower member which projects below the open lower end of the outer cylinder and through a collar. The small lower member has torque carrying lugs which correspond to circumferentially spaced grooves in the collar which attaches to the outer cylinder's lower end and which is at a unique rotational position for clocking the alignment of the landing gear.

PATENTED DEC 15 1970
3,547,425
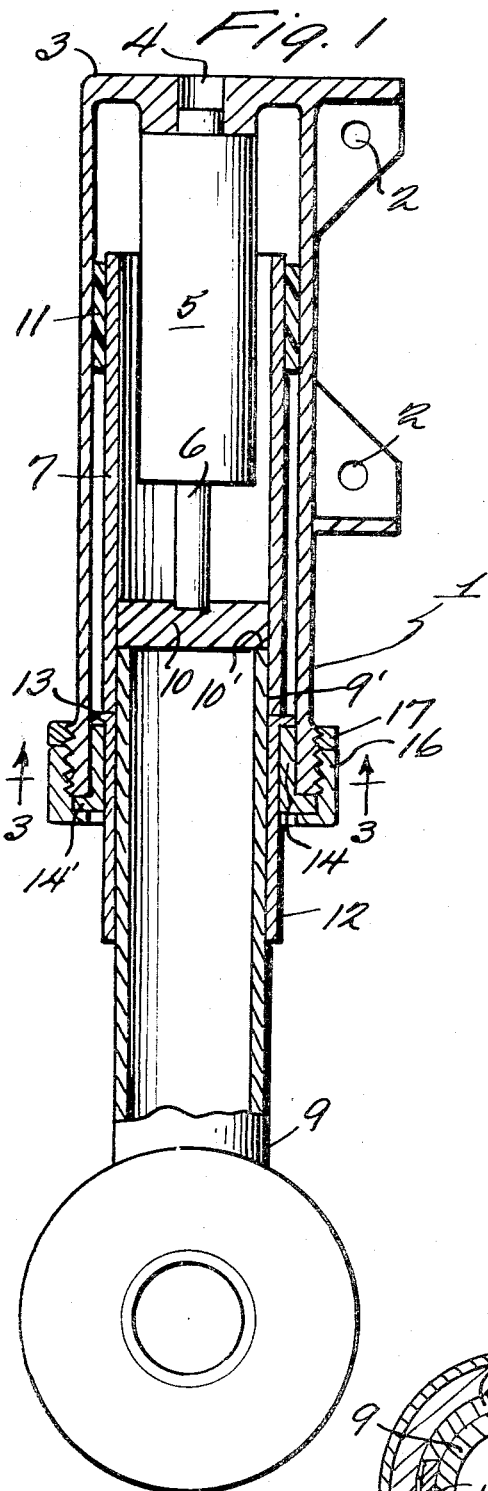
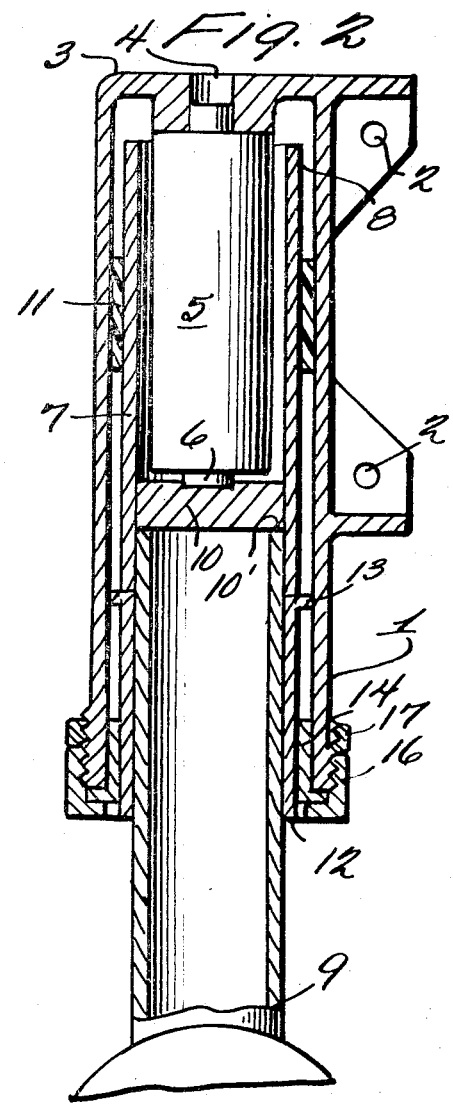
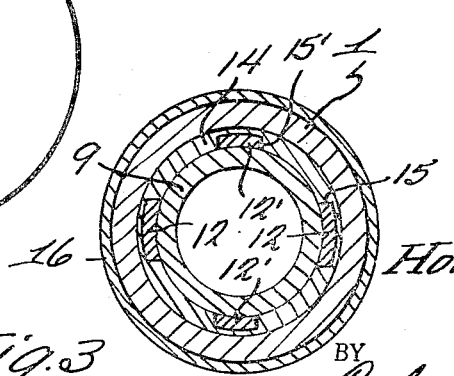
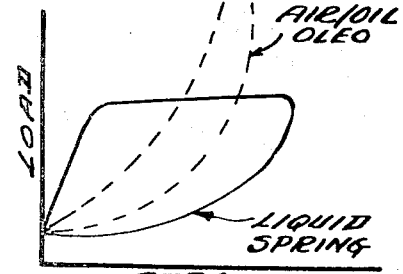
Fig. 1
Fig. 2
Fig. 3
Fig. 4
INVENTOR
HOWARD W. WACHENHEIM
BY Cushman, Darby & Cushman
ATTORNEYS

LANDING GEAR ASSEMBLY

BACKGROUND OF THE INVENTION

This invention relates to a new type of easily maintainable, inexpensive and reliable aircraft landing gear incorporating as an enclosed, protected, easily replaceable cartridge, a compressible fluid device. Also provided are means of transmitting torque by the use of lugs, splines, or noncircular cross-sectional shapes.

Aircraft landing gears have been proposed using liquid springs directly as the structural member connecting aircraft structure to the wheel and line assembly as disclosed by Taylor in U.S. Pat. Nos. 2,873,963 and 2,909,368. This arrangement, although satisfactory on an experimental basis, exposes the liquid spring itself with its associated seals to the corrosive and wearing environment associated with the underside of an aircraft. The exhaust gases are normally discharged in that area, while propeller vibration and the rotational slip stream impinge on the landing gear area as well as mud, gravel, dust and water from normal ground operations. Since the sealing and fit tolerances are critical to the efficient operation of liquid springs, the corrosive environment to which these springs are subjected in prior art landing gear arrangements is injurious to the life of the spring so as to result in the necessity of frequent, difficult and expensive maintenance.

The liquid spring has also been prepared for use in lever linkage landing gears for helicopter installation; however, such spring installations suffer from exposure to the same corrosive environment with the same injurious results.

For these and other reasons, the liquid spring has not been used extensively but, rather, the conventional air/oil oleo strut has been used. However, these suffer from a number of additional disadvantages not inherent in the liquid spring. The air/oil oleo has a quantity of air which is used as a spring. It is, therefore, subject to both oil and air leaks and must frequently be checked if it is to be maintained at proper pressure for safe operation. It is not uncommon in aircraft which have seen substantial service to find that the landing gear strut has lost its air to the extent that the upper strut is "bottomed" on the wheel and tire assembly, thus yielding the entire system useless without difficult and costly maintenance. The frequent loss of oil due to leakage also causes loss of the shock absorbing characteristics in such air/oil oleos.

Landing gears have also traditionally depended on a scissors linkage arrangement for carrying torsional loads from the lower member to the upper member. The most common arrangement of this mechanism is a structural linkage pivoted around a horizontal axis on the lower member, a structural linkage pivoted around a parallel axis on the upper member with the two opposite ends of these linkages pivotally connected around a third parallel axis, whereby torsion around the axis of the lower member is transmitted directly to the upper member but whereby no vertical loads are transmitted.

These type torque carrying mechanisms have structure that is exposed to damage caused by blows from objects during ground operations so as to cause damage to exposed pivots and pivot pins resulting in jamming of the linkage. The linkage also serves the function, as does the collar of this invention, to retain the lower member of the strut after the aircraft has become airborne. Loss of any one of the pins used in the linkage type mechanism may cause, and has caused, loss of the lower part of a shock strut and the wheel attached thereto after the load on the gear has been removed and the aircraft has become airborne, and looseness of this scissors is a common cause of shimmying and vibration during ground operations in a nose wheel.

SUMMARY OF THE INVENTION

These and other problems and disadvantages associated with the prior art are overcome by the invention disclosed herein by providing a protected, compressible fluid device landing gear wherein the compressible fluid device can be easily and rapidly replaced as a cartridge so as to greatly reduce maintenance time, both the elapsed "down-time" for an aircraft and from the standpoint of maintenance man-hours. The compressible fluid device is contained in an outer member, which may be generally cylindrical in configuration, and an inner assembly which is in telescoping relationship with the outer cylinder. It should be understood, however, that shapes other than cylindrical may be used for the outer member and for the inner assembly. The compressible fluid device is in contact with the outer cylinder at one end and the inner assembly at the other. The inner assembly may include one or more parts and has a lower end which is attached to an axle and wheel assembly. The outer surface of the inner assembly has a large upper cylindrical member which is in telescoping or sliding relationship with the inner surface of the outer member. A cavity within the inner assembly extends beyond the large member end into a smaller lower member or portion of the inner assembly. The outer member is closed at its upper end and a collar is attached to the lower end thereof. This collar has a hole or aperture through which passes the small lower end of the inner assembly. The lower member of the inner assembly has torque lugs radiating from its outer surface and extending axially of the lower member over a distance corresponding to at least the maximum passage of the inner assembly through the aperture of the collar. The collar's hole incorporates lug receiving grooves which are circumferentially spaced around the aperture for receiving the torque lugs. These lugs while sliding freely through the opening in the collar will transfer torsional loads from the wheel and axle assembly and the lower part of the inner assembly to the outer member which is connected to the aircraft structure. The upper part of the inner assembly is contained within the outer member by the collar and when the strut is not loaded the lower end of the inner assembly's upper part contacts the collar so as to limit the movement of the inner assembly in the extended position.

This arrangement protects the compressible fluid device from the corrosive environment of the aircraft and prevents mechanical damage from impingement of gravel and other objects encountered in running operation. The strut is constructed so that it can be easily disassembled for removal and replacement of the compressible fluid device which is simply inserted into the outer member. The inner assembly and collar may be simply attached by a nut and jam nut to the outer cylinder.

The torque lugs automatically "clock" the lower portion of the inner assembly to the correct alignment with respect to the collar while the collar is automatically "clocked" to the correct alignment with respect to the outer member by means of castellations within the outer member which are adjusted to receive flanged portions of the collar.

The compressible fluid device utilized may be a liquid spring; however, any fluid or spring type shock device may be used. The many advantages of the liquid spring as opposed to the oleo strut are known in the art. The liquid spring is a better energy absorber and is capable of lowering the shock force below that of an oleo. Typical curves for load and stroke of an air oil oleo for a light aircraft and for a similar liquid spring in the same application are shown in FIG. 4.

The liquid spring is also much lighter for the energy absorbed than the oleo and is much smaller. An additional advantage over the air/oleo, as air is not used, is that the common problem of loss of air can not cause the loss of spring ability of the landing gear. If the liquid spring is permanently sealed and properly protected from damage, it will have extremely low failure and maintenance rates as compared to current landing gear designs. There are in fact manufacturers of liquid springs able to make lifetime guarantees on the liquid springs in an installation of the type described herein.

It is an object of this invention to provide an inexpensive and easily maintainable aircraft landing gear strut which incorporates a compressible fluid device.

It is an object of this invention to provide an aircraft landing gear which provides protection for a spring/shock unit.

It is an object of this invention to provide an aircraft landing gear which incorporates a spring/shock unit which can be removed and replaced easily.

It is an object of this invention to provide an aircraft landing gear strut which has an improved means of carrying torque from the lower part of the strut to the upper part.

Other objects and advantages of this invention will become apparent from the following description taken in connection with the accompanying drawings:

DESCRIPTION OF THE DRAWINGS

FIG. 1 is a reduced scale cross section of the strut assembly showing the liquid spring/shock in the fully extended portion;

FIG. 2 is a reduced scale cross section of the strut assembly showing the liquid/shock in fully compressed position;

FIG. 3 is a cross section of the assembly taken along the lines 3-3 in FIG. 1 as viewed from below illustrating the torque carrying lug passage through the torque collar.

FIG. 4 is a load/stroke curve for a liquid spring/shock and air/oil oleo.

DESCRIPTION OF THE PREFERRED EMBODIMENT

An outer member 1 is adapted to an aircraft or other vehicle structure through lugs 2 at its upper end. The outer member has a partially closed upper end 3 having a liquid spring/shock mounting hole 4 therethrough. The upper end of a liquid spring/shock 5 is inserted into the hole 4 with its compression rod 6 extending downwardly away from the closed end of the outer member.

An inner cylinder assembly 7 is slideably contained at its upper end in telescoping relationship with the upper cylinder 1.

The inner cylinder assembly 7 may include one machined member or two members and, as illustrated, consists of an upper cylinder 8 fixedly attached by means well known in the art to the upper end of a lower cylinder 9 at the surface 9'. The upper cylinder 8 surrounds the lower cylinder's upper end and a closure disc 10 rests on the top of the lower cylinder on the shoulder 10'. The upper surface of the compression rod 6 is in pressure contact with the disc 10, and the outer surface of the upper cylinder 8 is in sliding contact with ring 11.

The outer surface of the lower cylinder 9, e.g. has four torsion carrying lugs 12, extending radially from its surface and extending lengthwise from an extension stop or flange 13 at the lugs' upper ends. While four torque lugs are shown, it should be understood that other than four lugs could be used and this invention contemplates generally application of a noncircular cross section shape to transfer torque in aircraft landing gears. The lugs extend lengthwise of the lower cylinder 9 to a point on the surface thereof which corresponds generally to the outer member's lower extremity at the condition of maximum compression of the liquid spring or minimum length of the entire strut.

A collar 14 may be installed in a predetermined rotational position with respect to the major axis of the outer member by, for example, providing a predetermined number of sized castellations in the lower edge of the outer member 1 into which fit a like number of mating flanges 14'. The collar 14 is then contained on member 1 by a nut 16 and jam nut 17.

The collar 14 has a hole through which passes the lower cylinder 9, and the collar's hole has radially arranged torque lug receiving grooves 15-15 and 15'-15' (FIG. 3) circumferentially spaced around the hole or aperture through which pass the torque carrying lugs 12. Each of the receiving groove pairs 15-15 and 15'-15' are formed so that grooves 15-15 are of the same size as one another, as are grooves 15'-15' while 15' and 15 are different sizes with respect to each other. The lugs 12 and 12' (FIG. 3) are of mating sizes with respect to grooves 15 and 15' respectively, to enable the positioning of member 9 in either of only two positions 180° from each other. Thus, the same identical gear assembly can be used on the left or right side of the aircraft by merely inserting the member 9 and the lugs 12 and 12' into the collar at one of two positions that are 180° apart.

The lugs 2 are fixed to the aircraft structure therefore orienting the outer member 1 to the correct position. This causes the collar 14 to be correctly positioned since it can only be installed in the correctly "clocked" position. As a result the lower cylinder 9 and its attached running gear are correctly positioned for either left or right hand installation as selected during assembly.

In the fully extended position (FIG. 1) the liquid spring 5 forces the inner cylinder assembly 7 downward with respect to the outer cylinder 1 by forcing the disc 10 away from the outer cylinder's closed end 3. The inner cylinder assembly 7 therefore will extend, if no load is applied, to the point at which the extension stop flange 13 contacts the top of the collar 14 resulting in a very strong retainer for the inner cylinder assembly 7 in flight.

The inner cylinder assembly under load will compress the liquid spring/shock by means of the disc 10 following the advantageous load stroke curve of a liquid/spring/shock until the compression rod 6 is fully compressed to its "bottomed out" position.

The liquid spring/shock 5 may be removed and replaced easily by loosening jam nut 17, removing nut 16 and by removing the collar 14. The inner cylinder assembly 7 may then be readily removed allowing the liquid spring/shock 5 to drop out. Another spring/shock may be quickly inserted into the mounting hole, the inner cylinder assembly 7 replaced and the collar replaced thereby resulting in a completely new shock absorbing system in the aircraft landing gear and resulting in a very significant gain in maintenance and overall cost and time over removal and overhaul of air/oil oleo shock strut assemblies.

This invention thus provides a unique landing gear or shock assembly for use with aircraft or other vehicles. The landing gear is characterized by having far fewer parts than prior art assemblies and by providing a liquid spring, oleo, or even a standard mechanical spring in a protected position away from the contaminating environment associated with the underside of aircraft. The assembly of this invention also uniquely provides for the application of torque and is uniquely arranged so as to facilitate quick, easy and inexpensive maintenance.

It should be understood, of course, that the foregoing disclosure relates to only a preferred embodiment of the invention and that numerous modifications or alterations may be made therein without departing from the spirit and scope of the invention as set forth in the appended claims. For example, a liquid spring shock in a similar cartridge-type arrangement may be applicable for use with guns of all sizes (including large Naval weapons) wherein the cartridge may be placed between the barrel and the mounting structure of the gun so as to absorb the shock of recoil.

I claim:

1. A landing gear for use with aircraft or other vehicles, and constructed for easy maintenance, said landing gear comprising:

an outer member for attachment to said aircraft;

an inner assembly in predetermined telescoping relationship with said outer member for movement relative to said outer member between an extended position and a compressed position; and compressible spring cartridge means within said outer member and said inner assembly for controlling the relative movement therebetween, said spring cartridge means acting as a spring and shock absorber to reduce the shock force to said aircraft upon landing, and wherein said spring cartridge means is readily removable from said landing gear.

2. A landing gear as in claim 1 wherein said compressible spring cartridge means includes a liquid spring.

3. A landing gear as in claim 1 wherein said inner assembly includes:

an upper member operatively located within said outer member for relative movement therewith;

a lower member integral with the lower end of said upper member and extending substantially beyond the limits of one end of said outer member;

a closure disc in contiguous relationship with a portion of said lower member; and said spring cartridge means including a compression rod in pressure contact with said disc whereby movement of said disc in response to movement of said lower member results in corresponding movement of said compression rod to cushion the shock force to said aircraft upon landing.

4. A landing gear as in claim 3 wherein said upper and lower members form a unitary structure.

5. A landing gear as in claim 3 wherein said lower member is fixedly attached to the lower end of said upper member.

6. A landing gear as in claim 3 further including:

a collar fixedly attached to the lower end of said outer member in predetermined positioned relationship;

said collar including an aperture therein with spaced lug receiving grooves adjacent to and circumferentially spaced around said aperture.

7. A landing gear as in claim 6 wherein said lower member includes torque carrying lugs corresponding to said lug receiving grooves, said lugs extending radially from the outer surface of said lower member and lengthwise along said lower member for a distance corresponding to at least the maximum distance of movement of said lower member through said aperture; said lower member fitting in mating relationship with said aperture.

8. A landing gear as in claim 7 further including:

a ring member fixedly attached to the inside surface of said outer member;

the outer surface of said upper member slideably engaging the inside surface of said ring member between the compressed and extended positions of said inner assembly.

9. A landing gear as in claim 8 further including an extension stop at the upper ends of said lugs for engagement with said collar when said inner assembly is in the extended position.

10. A landing gear as in claim 1 wherein said outer member includes a shock mounting aperture; said spring cartridge means being mounted with a first end portion inserted within said shock mounting aperture and a second end in contact with a predetermined portion of said inner assembly to enable the controlled relative movement of said inner assembly with respect to said outer member.

11. A landing gear as in claim 10 wherein said spring cartridge means, said outer member, said upper member and said lower member are generally cylindrical in shape and are oriented in spaced relationship with a common axis.

12. A landing gear as in claim 11 further including means for retaining said collar in fixed predetermined relationship with respect to said outer member.

13. A method of quickly and easily assembling a landing gear comprising the steps of:

positioning a spring cartridge within an outer member with a first end of said spring cartridge in contact with a closed end of said outer member;

inserting an inner assembly into telescoping relationship with said outer member and into contact with a second end of said spring cartridge; and attaching a collar to said outer member in predetermined positioned relationship wherein said inner assembly is in slideable engagement with an aperture within said collar.

14. A shock-absorbing assembly, comprising:

an outer member;

an inner assembly in telescoping relationship with said outer member for movement relative to said outer member between an extended position and a compressed position; and compressible spring cartridge means within said outer member and said inner assembly for controlling the relative movement therebetween, said spring cartridge means acting as a spring and shock absorber, and wherein said spring cartridge means is readily removable from said assembly.